(12) United States Patent
Lin et al.

(10) Patent No.: US 12,119,887 B2
(45) Date of Patent: Oct. 15, 2024

(54) INTELLIGENT RADIO FREQUENCY INTERFERENCE MITIGATION IN A COMPUTER

(71) Applicant: HEWLETT-PACKARD DEVELOPMENT COMPANY, L.P., Spring, TX (US)

(72) Inventors: Ruei-Ting Lin, Taipei (TW); Cheng-Fang Lin, Taipei (TW); Huai-yung Yen, Taipei (TW); Ren-Hao Chen, Taipei (TW); Lo-Chun Tung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 176 days.

(21) Appl. No.: 17/950,797

(22) Filed: Sep. 22, 2022

(65) Prior Publication Data

US 2024/0106548 A1 Mar. 28, 2024

(51) Int. Cl.
*G06F 9/44* (2018.01)
*G06F 9/448* (2018.01)
*H04B 15/00* (2006.01)
*H04W 84/12* (2009.01)

(52) U.S. Cl.
CPC ............. *H04B 15/00* (2013.01); *G06F 9/448* (2018.02); *H04W 84/12* (2013.01)

(58) Field of Classification Search
CPC ......... H04B 15/00; G06F 9/448; H04W 84/12
See application file for complete search history.

(56) References Cited

U.S. PATENT DOCUMENTS

| 11,539,711 B1* | 12/2022 | Miller ................. H04L 63/1483 |
| 2009/0080498 A1 | 3/2009 | Deisher et al. |
| 2012/0144224 A1* | 6/2012 | Machnicki ............. H04B 15/06 713/500 |
| 2013/0229994 A1* | 9/2013 | Kim .................... H04W 72/541 370/329 |
| 2017/0090509 A1* | 3/2017 | Mukker .............. G06F 13/4291 |

OTHER PUBLICATIONS

Burton, E. A., et al., "FIVR—Fully integrated voltage regulators on 4th generation Intel® Core™ SoCs," 2014 IEEE Applied Power Electronics Conference and Exposition—APEC 2014, Apr. 24, 2014, pp. 432-439.

(Continued)

*Primary Examiner* — Zahid Choudhury
(74) *Attorney, Agent, or Firm* — Knobbe, Martens, Olson & Bear, LLP

(57) ABSTRACT

The present disclosure provides intelligent radio frequency interference mitigation in a computing platform. The computing platform includes a processor, a memory, a system clock and a wireless network interface. The system clock can be controlled so that the processor and/or the memory may operate at a slow frequency or a fast frequency. The wireless network may operate on a radio channel that experiences radio frequency interference at the fast frequency. The system clock may be intelligently controlled to select the slow frequency to reduce radio frequency interference to prioritize execution of a network application, or to select the fast frequency to increase processor speed and prioritize execution of a local application.

20 Claims, 8 Drawing Sheets

(56) References Cited

OTHER PUBLICATIONS

Intel, "12th Generation Intel Core Processors" Datasheet, vol. 1 of 2, Jun. 8, 2022, pp. 208.
Jackum, T. et al., "A digitally controlled linear voltage regulator in a 65nm CMOS process," 2010 17th IEEE International Conference on Electronics, Circuits and Systems, Dec. 12, 2010, 5 pages.

* cited by examiner 802.11n and 802.11ac — MCS, SNR and RSSI — 240-1

| HT MCS | VHT MCS | Modulation | Coding | 20MHz Data Rate 800ns | 20MHz Data Rate 400ns | 20MHz Min. SNR | 20MHz RSSI | 40MHz Data Rate 800ns | 40MHz Data Rate 400ns | 40MHz Min. SNR | 40MHz RSSI | 80MHz Data Rate 800ns | 80MHz Data Rate 400ns | 80MHz Min. SNR | 80MHz RSSI | 160MHz Data Rate 800ns | 160MHz Data Rate 400ns | 160MHz Min. SNR | 160MHz RSSI |
|---|---|---|---|---|---|---|---|---|---|---|---|---|---|---|---|---|---|---|---|
| \multicolumn{20}{l}{1 Spatial Stream} |
| 0 | 0 | BPSK | 1/2 | 6.5 | 7.2 | 2 | -82 | 13.5 | 15 | 5 | -79 | 29.3 | 32.5 | 8 | -76 | 58.5 | 65 | 11 | -73 |
| 1 | 1 | QPSK | 1/2 | 13 | 14.4 | 5 | -79 | 27 | 30 | 8 | -76 | 58.5 | 65 | 11 | -73 | 117 | 130 | 14 | -70 |
| 2 | 2 | QPSK | 3/4 | 19.5 | 21.7 | 9 | -77 | 40.5 | 45 | 12 | -74 | 87.8 | 97.5 | 15 | -71 | 175.5 | 195 | 18 | -68 |
| 3 | 3 | 16-QAM | 1/2 | 26 | 28.9 | 11 | -74 | 54 | 60 | 14 | -71 | 117 | 130 | 17 | -68 | 234 | 260 | 20 | -65 |
| 4 | 4 | 16-QAM | 3/4 | 39 | 43.3 | 15 | -70 | 81 | 90 | 18 | -67 | 175.5 | 195 | 21 | -64 | 351 | 390 | 24 | -61 |
| 5 | 5 | 64-QAM | 2/3 | 52 | 57.8 | 18 | -66 | 108 | 120 | 21 | -63 | 234 | 260 | 24 | -60 | 468 | 520 | 27 | -57 |
| 6 | 6 | 64-QAM | 3/4 | 58.5 | 65 | 20 | -65 | 121.5 | 135 | 23 | -62 | 263.3 | 292.5 | 26 | -59 | 526.5 | 585 | 29 | -56 |
| 7 | 7 | 64-QAM | 5/6 | 65 | 72.2 | 25 | -64 | 135 | 150 | 28 | -61 | 292.5 | 325 | 31 | -58 | 585 | 650 | 34 | -55 |
|  | 8 | 256-QAM | 3/4 | 78 | 86.7 | 29 | -59 | 162 | 180 | 32 | -56 | 351 | 390 | 35 | -53 | 702 | 780 | 38 | -50 |
|  | 9 | 256-QAM | 5/6 |  |  | 31 | -57 | 180 | 200 | 34 | -54 | 390 | 433.3 | 37 | -51 | 780 | 866.7 | 40 | -48 |
| \multicolumn{20}{l}{2 Spatial Stream} |
| 8 | 0 | BPSK | 1/2 | 13 | 14.4 | 2 | -82 | 27 | 30 | 5 | -79 | 58.5 | 65 | 8 | -76 | 117 | 130 | 11 | -73 |
| 9 | 1 | QPSK | 1/2 | 26 | 28.9 | 5 | -79 | 54 | 60 | 8 | -76 | 117 | 130 | 11 | -73 | 234 | 260 | 14 | -70 |
| 10 | 2 | QPSK | 3/4 | 39 | 43.3 | 9 | -77 | 81 | 90 | 12 | -74 | 175.5 | 195 | 15 | -71 | 352 | 390 | 18 | -68 |
| 11 | 3 | 16-QAM | 1/2 | 52 | 57.8 | 11 | -74 | 108 | 120 | 14 | -71 | 234 | 260 | 17 | -68 | 468 | 520 | 20 | -65 |
| 12 | 4 | 16-QAM | 3/4 | 78 | 86.7 | 15 | -70 | 162 | 180 | 18 | -67 | 351 | 390 | 21 | -64 | 702 | 780 | 24 | -61 |
| 13 | 5 | 64-QAM | 2/3 | 104 | 115.6 | 18 | -66 | 216 | 240 | 21 | -63 | 468 | 520 | 24 | -60 | 836 | 1040 | 27 | -57 |
| 14 | 6 | 64-QAM | 3/4 | 117 | 130.3 | 20 | -65 | 242 | 270 | 23 | -62 | 526.5 | 585 | 26 | -59 | 1053 | 1170 | 29 | -56 |
| 15 | 7 | 64-QAM | 5/6 | 130 | 144.4 | 25 | -64 | 270 | 300 | 28 | -61 | 585 | 650 | 31 | -58 | 1170 | 1300 | 34 | -55 |
|  | 8 | 256-QAM | 3/4 | 156 | 173.3 | 29 | -59 | 324 | 360 | 32 | -56 | 702 | 780 | 35 | -53 | 1404 | 1560 | 38 | -50 |
|  | 9 | 256-QAM | 5/6 |  |  | 31 | -57 | 360 | 400 | 34 | -54 | 780 | 866.7 | 37 | -51 | 1560 | 1722 | 40 | -48 |

From. Fig. 4A

| | | | | 3 Spatial Stream | | | | | | | | | | | | |
|---|---|---|---|---|---|---|---|---|---|---|---|---|---|---|---|---|
| 16 | 0 | BPSK | 1/2 | 19.5 | 21.7 | 2 | -82 | 40.5 | 15 | 5 | -79 | 87.8 | 97.5 | 8 | -76 | 175.5 | 195 | 11 | -73 |
| 17 | 1 | QPSK | 1/2 | 39 | 43.3 | 5 | -79 | 81 | 90 | 8 | -76 | 175.5 | 195 | 11 | -73 | 351 | 390 | 14 | -70 |
| 18 | 2 | QPSK | 3/4 | 58.5 | 65 | 9 | -79 | 121.5 | 135 | 12 | -74 | 263.3 | 292.5 | 15 | -71 | 526.5 | 585 | 18 | -68 |
| 19 | 3 | 16-QAM | 1/2 | 78 | 86.7 | 11 | -74 | 162 | 180 | 14 | -71 | 351 | 390 | 17 | -68 | 702 | 780 | 20 | -65 |
| 20 | 4 | 16-QAM | 3/4 | 117 | 130 | 15 | -70 | 243 | 270 | 18 | -67 | 526.5 | 585 | 21 | -64 | 1053 | 1170 | 24 | -61 |
| 21 | 5 | 64-QAM | 2/3 | 156 | 173.3 | 18 | -66 | 324 | 360 | 21 | -63 | 702 | 780 | 24 | -60 | 1404 | 1560 | 27 | -57 |
| 22 | 6 | 64-QAM | 3/4 | 175.5 | 195 | 20 | -65 | 364.5 | 405 | 23 | -62 | | | 26 | -59 | 1580 | 1755 | 29 | -56 |
| 23 | 7 | 64-QAM | 5/6 | 195 | 216.7 | 25 | -64 | 405 | 450 | 28 | -61 | 877.5 | 975 | 31 | -58 | 1755 | 1950 | 34 | -55 |
| | 8 | 256-QAM | 3/4 | 234 | 260 | 29 | -59 | 486 | 540 | 32 | -56 | 1053 | 1170 | 35 | -53 | 2106 | 2340 | 38 | -50 |
| | 9 | 256-QAM | 5/6 | 260 | 288.9 | 31 | -57 | 540 | 600 | 34 | -54 | 1170 | 1300 | 37 | -51 | | | 40 | -48 |

FIG. 4B 240-2

| Threshold | Quality Measurement (HT-MCS) |
|---|---|
| Low Threshold | 2 |
| High Threshold | 20 |

FIG. 5

INTELLIGENT RADIO FREQUENCY INTERFERENCE MITIGATION IN A COMPUTER

BACKGROUND

Advanced computers have memory and processors that may operate at clock frequencies that interfere with the radio frequencies of wireless interfaces, thereby reducing data transmission speeds over the wireless interface.

BRIEF DESCRIPTION OF THE FIGURES

FIG. 4A shows an example of a first portion of an MCS index, being one way to implement the quality table stored in the example computer of FIG. 1.

FIG. 4B shows the remainder of the MCS index of FIG. 4A.

FIG. 5 shows an example of the criteria table stored in the example computer of FIG. 2.

DETAILED DESCRIPTION

Figure 1:
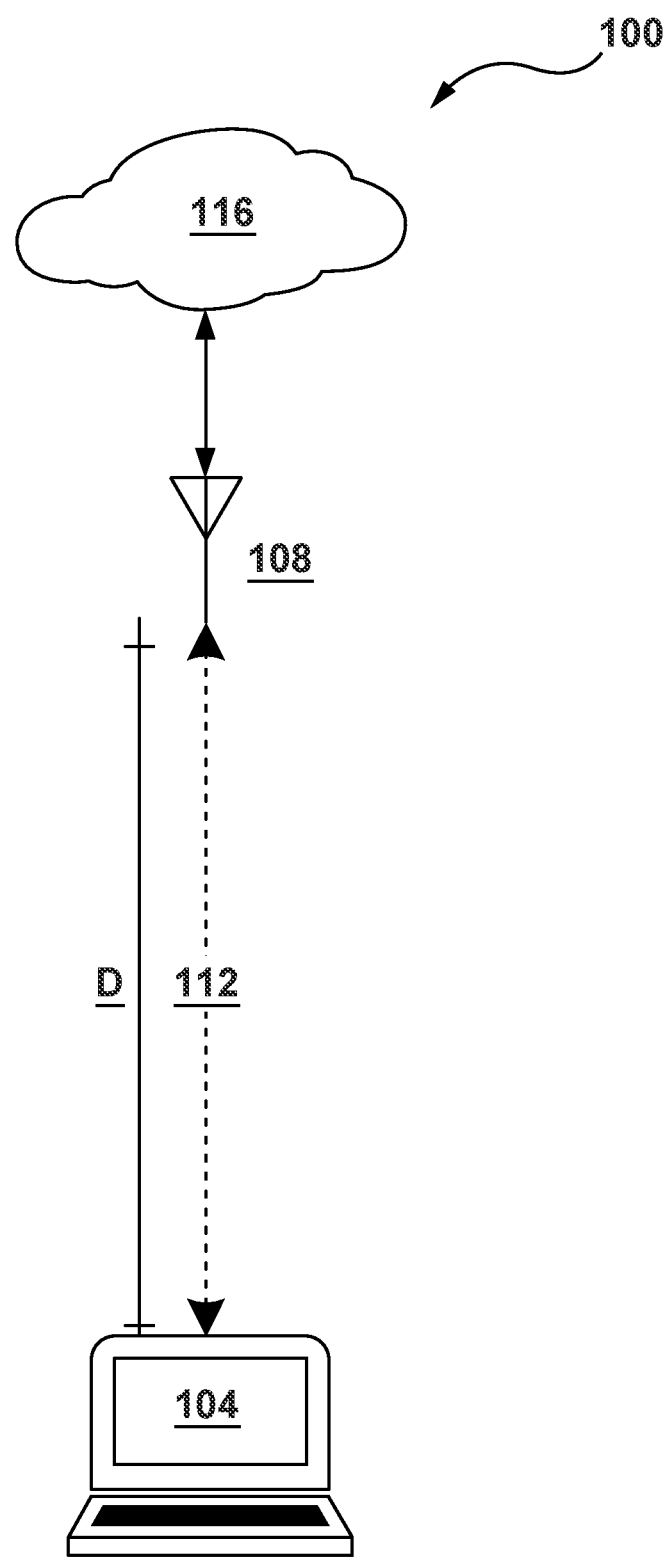
FIG. 1 is a schematic diagram of an example computer that may connect to a wireless network.

Computers regularly transmit data over wireless networks, such as wireless local area networks (WLAN). Modern computers also have processors and memory that operate at fast frequencies. Sometimes the fast frequencies of the processors and memory interfere with the data transmission speeds over the wireless networks. The interference and its effect on transmission speeds can vary depending on several factors including the distance between the computer and the wireless base station of the physical network. To mitigate the effects of the interference, the processors and memory may have adjustable clock frequencies. To elaborate, in the event of interference, the clock frequency may be slowed to differentiate the processor and memory frequency from the radio-frequency physics of the wireless network interface, thereby allowing the data transmissions to occur at higher speeds. At the same time, certain computer applications are more local in nature, in that they do not make significant use of the wireless network, while other computer applications are more networked in nature, in that they do make significant use of the wireless network. Thus, reducing the processing and memory frequency may result in noticeably degraded performance of the execution of a local application on the computer.

This disclosure provides intelligent radio frequency mitigation in a computing platform. In an example, the computing platform includes a memory to store a network application, a local application, and a radio frequency interference mitigation (RFIM) application. The computing platform also includes a processor connected to the memory to execute the network application or the local application. The processor also executes the RFIM application. The processor and/or the memory may operate at a slow frequency or a fast frequency. The computing platform also includes a wireless interface connected to the processor and a wireless network. The wireless interface may transmit data over the network via a channel that has a lower speed at the fast frequency and a higher speed at the slow frequency. The RFIM application may receive an instruction to select the fast frequency when the processor prioritizes executing the local application or the slow frequency when the processor prioritizes executing the networked application.

As used in this disclosure, for simplicity, the term transmit may refer to both sending and receiving functions, sometimes also referred to as "transceiving." Also, when referring to clock frequency, processor frequency or memory frequency, it is to be understood that in substance these terms refer to the same overall processing frequency of the computer, separate from the data transmission speeds over the wireless network. In general, the disclosure reserves the terms "higher speed" and "lower speed" to refer to data transmission, and the terms "fast frequency" and "slow frequency" to refer computer processing. However, this choice of nomenclature is for clarity and simplicity in this disclosure and does imply that computer processing cannot be expressed in terms of speed, nor that wireless data transmission cannot be expressed in terms of frequency, as in the context of "radio-frequency".

FIG. 1 shows a system 100 that includes a computer 104 that connects to a base station 108 via a wireless link 112. The base station 108 in turn connects to a network 116, such as the Internet. FIG. 1 also shows a distance D which represents the distance between the base station 108 and the computer 104. While FIG. 1 graphically depicts the computer 104 as a laptop, it is contemplated that the computer 104 may be any type of computer that connects over the wireless link 112, including a tablet computer, a mobile phone or a desktop computer.

Figure 2:
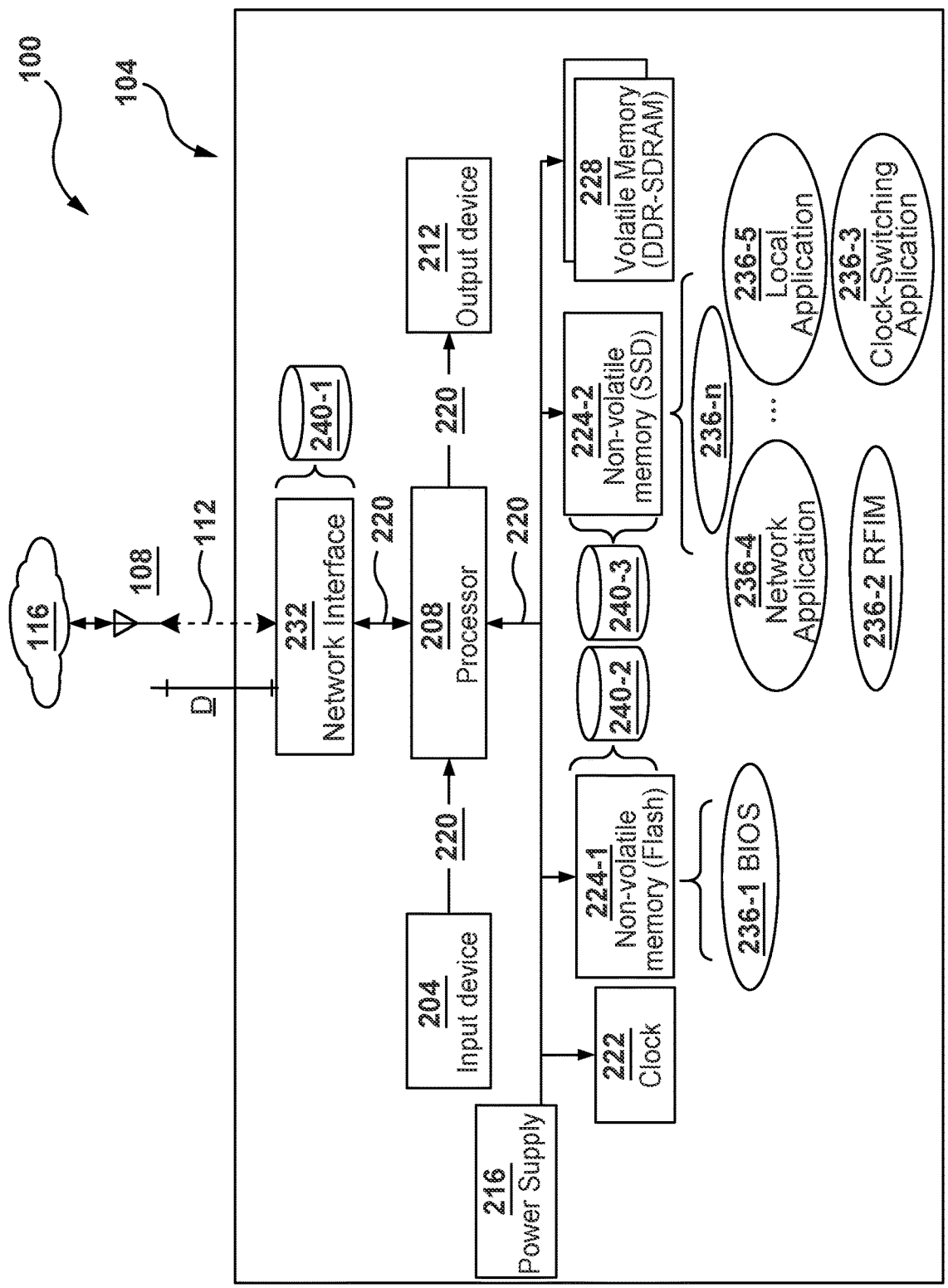
FIG. 2 is a block diagram of the internal components of the example computer of FIG. 1.

FIG. 2 shows a schematic diagram of the internal components of the computer 104. In this example, the computer 104 includes at least one input device 204 which may include a keyboard or other input devices. In variants, other input devices are contemplated. Input from device 204 is received at a processor 208 which in turn controls an output device 212 such as a display or other output devices.

The processor 208 may be implemented as a plurality of processors or multi-core processors. The processor 208 may be configured to execute different programing instructions responsive to the input received via the one or more input devices and to control one or more output devices to generate output on those devices. The processor 208 may be operated at two different frequencies including a slow frequency, such as 4400 MHz or a fast frequency, such as 4800 MHz. In variants, the processor may be operated at additional slower frequencies including 2000 MHz and 3600 MHz. At the fast frequency, the processor 208 executes applications more quickly than at the slow frequency. In the present example, the processor 208 is based on the modern Intel™ processors. However, this is a non-limiting example, and implementations of the present disclosure can be applied to other processors and are not limited to Intel™ architectures or processors. Rather, any processor or memory that may operate at a processing frequency that interferes with the radio-frequency of wireless interface is contemplated as within scope of the present disclosure.

A power supply 216 connects to the processor 208 via a bus 220 to provide power to the processor 208 and other components along the bus 220, including a system clock 222.

To fulfill its programming functions, the processor 208 is configured to communicate with one or more memory units, including non-volatile memory and volatile memory. Non-volatile memory units 224 can be based on any persistent memory technology, such as an Erasable Electronic Programmable Read Only Memory ("EEPROM"), flash memory, solid-state hard disk (SSD), other type of hard-disk, or combinations of them. In the present non-limiting example, a first non-volatile memory unit 224-1 is based on flash memory while a second non-volatile memory unit 224-2 is based on a solid-state hard disk. (Collectively, non-volatile memory units 224-1, 224-2 are referred to as non-volatile memory units 224, and generically, as non-volatile memory 224.) The non-volatile memory units 224 may also be described as a non-transitory computer readable media.

Volatile memory 228 is based on any random access memory (RAM) technology. In the present example the volatile memory 228 is based on a Double Data Rate (DDR) Synchronous Dynamic Random-Access Memory (SDRAM). Other types of volatile memory 228 are contemplated.

The system clock 222 provides a regular repeating signal to the processor 208, the volatile memory 228 and other components along the bus 220 that interconnects the components of the computer 104. In the present example, the system clock 222 has different operating frequencies so that the processor 208 may execute applications at different frequencies. As previously noted, specifically to the present example, the system clock 222 has a slow frequency and a fast frequency. The fast frequency in this example is 4800 MHz, and the slow frequency is any frequency less than 4800 MHz, including 4400 MHz. Additional or other slow frequencies include 3600 MHz or 2000 MHz.

The processor 208 and/or clock 222 combination may, in conjunction with the power supply 216 and associated circuitry, implement a Fully Integrated Voltage Regulator (FIVR) or Digital Linear Voltage Regulator (DLVR). An example discussion of a FIVR is discussed in E. A. Burton et al., "FIVR—Fully integrated voltage regulators on 4th generation Intel® Core™ SoCs," 2014 IEEE Applied Power Electronics Conference and Exposition—APEC 2014, 2014, pp. 432-439, doi: 10.1109/APEC.2014.6803344. Likewise, and example discussion of a DLVR is discussed in T. Jackum, G. Maderbacher, W. Pribyl and R. Riederer, "A digitally controlled linear voltage regulator in a 65 nm CMOS process," 2010 17th IEEE International Conference on Electronics, Circuits and Systems, 2010, pp. 982-985, doi: 10.1109/ICECS.2010.5724678. The contents of these citations are incorporated herein by reference.

The processor 208 also connects to a wireless network interface 232 which includes a buffer, a modulator/demodulator or MODEM, a radio and antenna for transmitting and receiving data over network 116 via the link 112 that connects the network interface 232 to the base station 108. In this example, the network interface 224, the base station 108 and the wireless link 112 are based on a wireless local area network (WLAN) in accordance with the Institute of Electrical and Electronic Engineers (IEEE) 802.11 standard and its variants, and in a particular example, wireless link 112 is based on a 2.4 GHz channel according to the IEEE 802.11ax standard. However, other types of wireless networks may be implemented.

Programming instructions in the form of applications 236-1, 236-2 . . . 236-n are typically maintained, persistently, in the non-volatile memory units 224 and used by the processor 208 which reads from and writes to the volatile memory 228 during the execution of the applications 224. (Collectively, applications 236-1, 236-2 . . . 236-n are referred to as applications 236, and generically, as application 236.)

In the present example, application 236-1 is a Basic Input/Output System (BIOS) while application 236-2 is a radio frequency interference mitigation (RFIM) application. Application 236-3 is a clock switching application which can control RFIM application 236-2 to change the frequency of the clock 222. Furthermore, application 236-4 is a network application while application 236-5 is a local application. One or more additional applications 236-n are contemplated.

The BIOS application 236-1 is commonly stored in flash or read only memory (ROM), in a non-volatile memory unit that is separate from other non-volatile memory that stores other applications 236. The BIOS application 236-1 is thus stored in non-volatile memory 224-1 and serves as the initial programming instructions for processor 208 on boot-up of the computer 104 and allows for basic hardware configure settings and peripheral awareness. The BIOS application 236-1 also serves to instruct processor 208 to load any operating systems (not shown), onto the processor 208, which in turn may be used to load and execute additional applications 236 onto the processor 208.

The RFIM mitigation application 236-2 may be based on known RFIM mitigation drivers such as the DDR Radio Frequency Interference Mitigation (DDR RFIM) feature from Intel Corporation, as discussed in 12th Generation Intel® Core™ Processors Datasheet, Volume 1 of 2 Rev. 8 Jun. 2022, Section 5.1.3.3. (https://edc.intel.com/content/www/us/en/design/ipla/software-development-platforms/client/platforms/alder-lake-desktop/12th-generation-intel-core-processors-datasheet-volume-1-of-2/008/). The content of this citation is incorporated herein by reference.

The clock-switching application 236-3 interacts with the network interface 232 to ascertain the quality of wireless link 112 and the type of application executing on processor 208 to activate or deactivate the RFIM function within RFIM application 236-2 based on criteria for desired overall performance of computer 104. The clock-switching application 236-3 will be discussed in greater detail below.

The network application 236-4 is any application that makes use of data transmission and reception along wireless link 112 during execution of the network application 236-4 on the processor 208. A non-exhaustive list of common network applications includes media services such as Youtube™, Spotify™, or online games such League of Legends™ or Fortnite™. Thus, there can be more than one network application within applications 224.

In contrast, the local application 236-5 is any application that does not use link 112. Alternatively, the difference between the network application 236-4 and the local application 236-5 is relative, in that the local application 236-5 may use less resources, (such as bandwidth, speed) along link 112 than network application 236-4. A non-exhaustive list of example local applications includes a spreadsheet application, a locally executing video game, or a drawing package. There can be more than one local application within applications 236.

Any number of additional applications 236-n may also be provided including additional local applications or network applications.

Also as shown in FIG. 2, a quality table 240-1 is stored in network interface 232 and a criteria table 240-2 is stored in non-volatile memory unit 224-1 for use by clock-switching application 236-3. Further, a quality of service ("QOS")

table 240-3 is stored in non-volatile memory 224-2 for use by clock-switching application 236-3. However, the tables 240 need not be stored in the specific locations indicated in FIG. 2. The tables 240 will be discussed in greater detail below. While not shown, additional tables may be included in computer 104.

Figure 3:
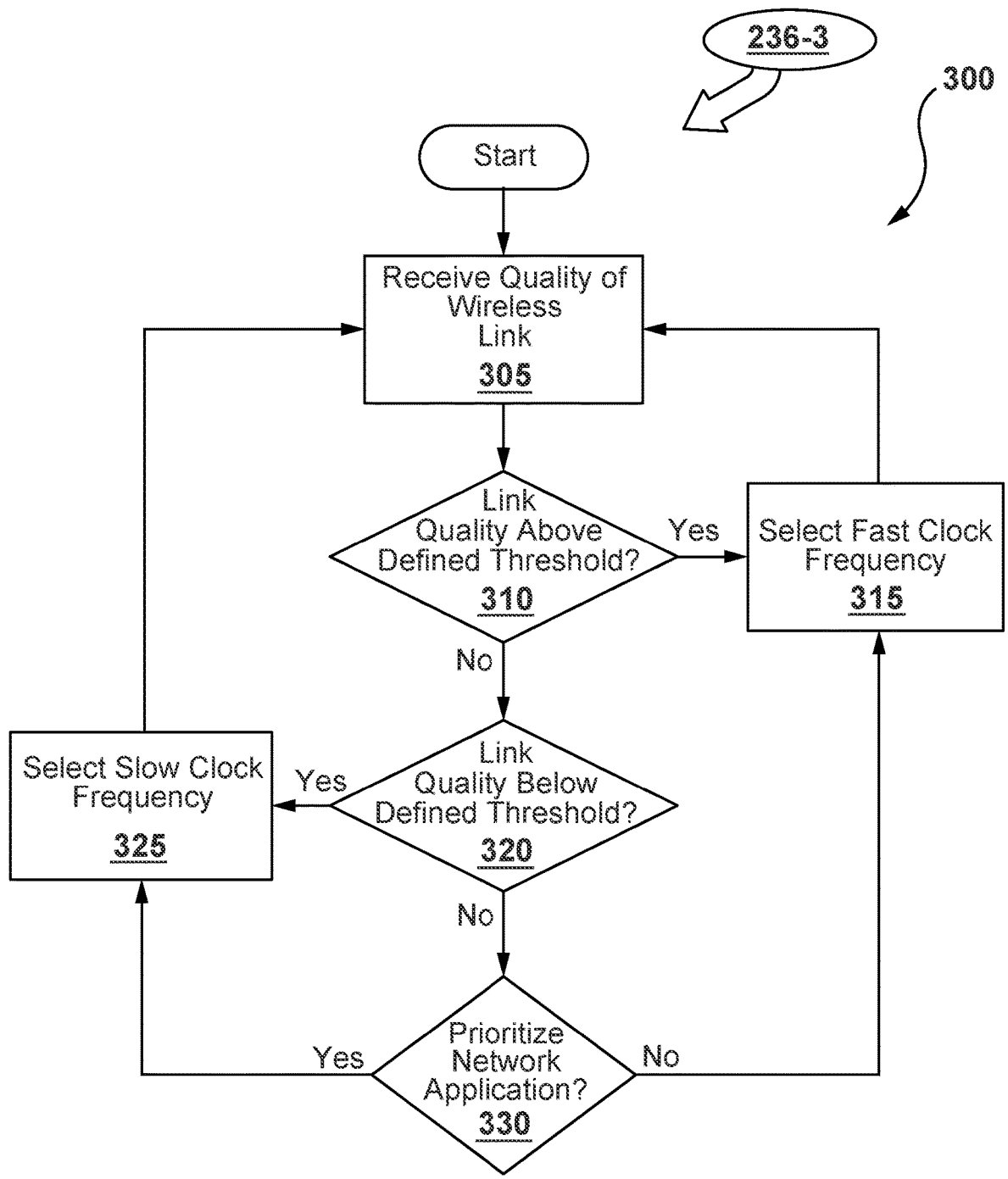
FIG. 3 shows a flowchart depicting an example method for intelligent radio frequency interference mitigation in an example computer such as the computer of FIG. 2.

FIG. 3 shows a flowchart depicting a method 300 of intelligent radio frequency interference mitigation (RFIM) in a computer. The method 300 represents example performance of the clock-switching application 236-3 and so in the present example is stored as a set of instructions as a computer readable medium in the form of non-volatile memory unit 224-2. Hereafter the method 300 and clock-switching application 236-3 may be referred to interchangeably, but it is to be understood that the method 300 may be implemented on computer 104 or a variant. The method 300 may also be varied. The steps in the method 300 may be performed in parallel or in a different order, and so each element is referred to as a block. For illustrative purposes, the method 300 will be discussed in relation to computer 104, but it is to be emphasized that variants of computer 104 contemplated.

Block 305 comprises receiving a quality measurement of the wireless link. In the context of the example of computer 104, it is the quality of wireless link 112 that is determined. The quality measurement is generated by network interface 232 and received by application 236-3 as it executes on processor 208. The means by which the quality is ascertained is not particularly limited, but in a present example the quality is determined using a Modulation and Coding Scheme (MCS) index that recites expected data transmission speeds over the wireless link 112 according to the variables maintained in the index. An example MCS index is shown in FIG. 4A and FIG. 4B which is one way of implementing quality table 240-1. As known to those skilled in the art, MCS indices may be based on approaches that consider variables such as coding schemes, modulation type, coding rate, data rates, signal to noise ratio (SNR), received signal strength indicator (RSSI), and how those variables may change for each radio-frequency channel. Other variable concepts associated with MCS indices will now occur to those skilled in the art including guard interval, spatial streams, channel width. In operation, network interface 232 implements the quality table 240-1 by measuring or assigning a value to each of the variables and then aggregating the result into a single MCS value. The single MCS value represents the overall quality of the wireless link 112. In the example quality table 240-1, there are two possible MCS values, each shown in the first two columns: namely, in the first column, a high throughput modulation and coding scheme (HT-MCS), and in the second column, a very high throughput modulation and coding scheme (VHT-MCS). Where quality table 240-1 is used, either value may be returned to application 236-3 at block 305. However, in accordance with a present example, it will be assumed that the HT-MCS value is returned at block 405, namely a number between zero and twenty-three. A person of skill in the art will now appreciate how quality table 240-1 may be implemented using an MCS index, and its variations, but that other ways of implementing the quality table 240-1 or indeed altogether different ways of determining the quality of the wireless link 112 are within the scope of implementations of the present disclosure.

Block 310 comprises determining whether the quality of the wireless link is above a predefined threshold. Continuing with the example from block 305, it is assumed that an HT-MCS value from the first column of quality table 240-1 between zero and twenty-three is returned. In a present example, the threshold value is twenty, and the determination is deemed met if the received HT-MCS value is greater than or equal to about twenty. However, the value for the threshold at block 310 is not particularly limited and may be chosen according to desired operating parameters of the relevant wireless link and the associated computer.

On a "yes" determination at block 310, the method 300 advances to block 315 where a fast clock frequency is selected. In the context of the example computer 104, at block 315 the clock-switching application 236-3 controls the RFIM application 236-2 to "disable" the RFIM function in accordance with the Intel™ standard RFIM driver functionality. This, in turn, causes the clock 222 to operate at 4800 MHz which in turn results in the processor 208 and the DDRAM in volatile memory 228 to operate at the fast frequency and thereby leads to overall faster processing than the slow frequency. In variants, however, block 315 can be implemented in computers that lack a specific RFIM application 236-2 to set the clock 222 to operate at the faster frequency.

On a "no" determination at block 310, when the received HT-MCS value is below the predefined threshold, then the method 300 advances to block 320.

Block 320 comprises determining whether the quality of the wireless link is below a predefined threshold. Continuing with the example from block 305 and block 310, it is again assumed that an HT-MCS value from the first column of the quality table 240-1 between zero and twenty-three was returned at block 305. In a present example, the threshold value is two, and the determination is deemed met if the received HT-MCS value is less than or equal to about two. However, the value for the threshold at block 320 is not particularly limited and may be chosen according to desired operating parameters of the relevant wireless link and the associated computer.

On a "yes" determination at block 320, the method 300 advances to block 325 where a slow clock frequency is selected. In the context of the example computer 104, at block 325 the clock-switching application 236-3 controls RFIM application 236-2 to "enable" the RFIM function in accordance with the Intel™ standard RFIM driver functionality. This, in turn, causes clock 222 to operate at 4400 MHz which in turn results in the processor 208 and the DDRAM of volatile memory 228 to operate at the slow frequency and thereby leads to overall slower processing speeds than the fast frequency. Interference between the wireless network interface 232 and the processor 208 is thereby mitigated. In variants, block 325 can be implemented in computers that lack a specific RFIM application 236-2 to set the clock 222 to operate at the slower frequency.

On a "no" determination at block 320, when the received HT-MCS value is not below the predefined threshold, then the method 300 advances to block 330.

A person of skill in the art will now recognize that the "No" determination at block 320 occurs when the HT-MCS value from the first column of the quality table 240-1, as received at block 305, lies between the threshold values of block 310 and block 320. Thus, the range in the present example is an HT-MCS value greater than two and less than twenty.

In the present example, the threshold values for block 310 and block 320 are stored in the criteria table 240-2. In a variant of computer 104, a graphical interface to update the criteria table 240-2 and set the threshold values for use by clock-switching application 236-3 may be incorporated into the BIOS application 236-1. Accordingly, the criteria table 240-2 is stored in non-volatile memory 224-1 along with the BIOS application 236-1. An illustrative example of the criteria table 240-2 is shown in FIG. 5.

Block 330 comprises determining whether to prioritize execution of a network application. In a first case, if the processor 208 is executing the local application 236-5 and is not executing the network application 236-4, it follows that the overall performance of the computer 104 is enhanced by the clock 222 (and in turn, the processor 208 and DDR-SDRAM volatile memory 228) operating at the faster frequency since the local application 236-5 makes little or no use of the wireless link 112. In other words, processing-frequency interference with radio-frequency interference is tolerated during execution of the local application 236-5, even with the accompanying drop in speeds over the wireless link 112. Thus, according to the first case, a "no" determination is reached leading to block 315 at which point the fast clock frequency is selected as previously described.

In a second case at block 330, if the processor 208 is executing the network application 236-4 and is not executing the local application 236-5, it follows that the overall performance of the computer 104 is enhanced by the wireless link 112 operating at a higher speed such that the clock 222 (and in turn, the processor 208 and DDR-SDRAM volatile memory 228) operates at the slower frequency since the network application 236-5 makes use of the wireless link 112. In this scenario, radio frequency interference between the wireless link 112 and the processor 208 is mitigated. Thus, according to the second case, a "yes" determination is reached leading to block 325 at which point the slow clock frequency is selected as previously described.

Figure 6:
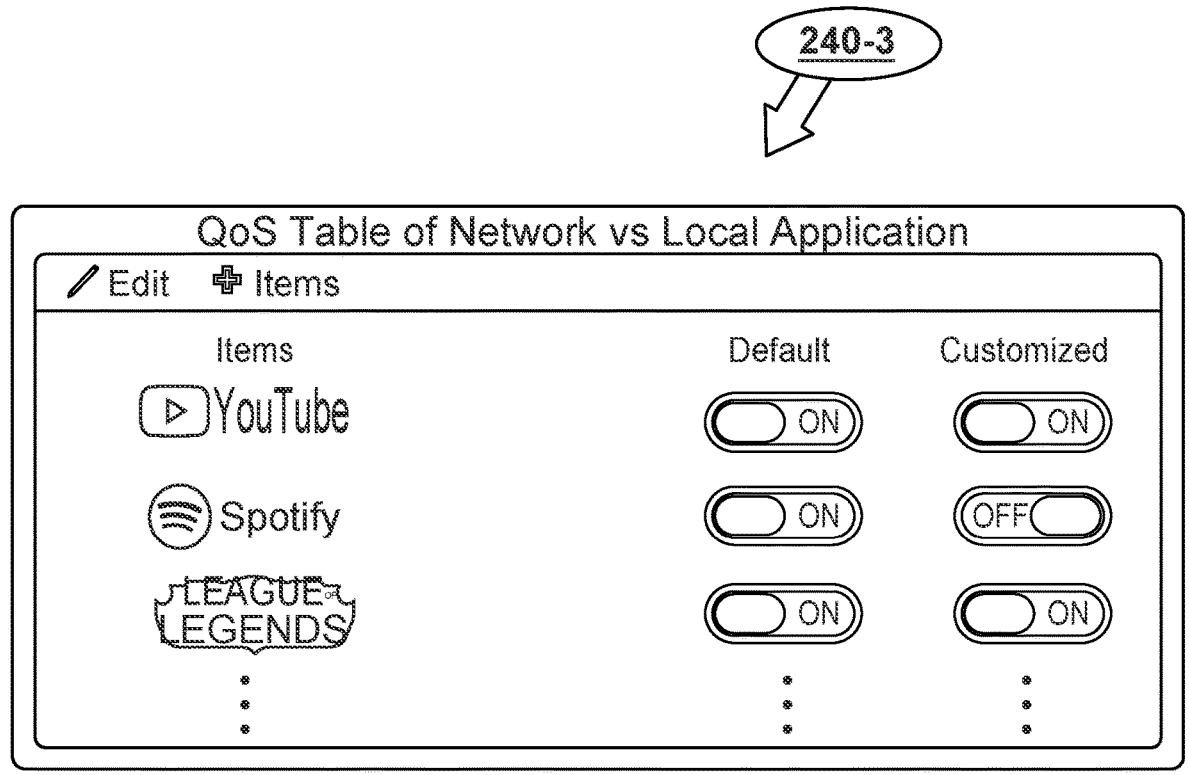
FIG. 6 shows an example of a graphical interface to implement a quality of service (QOS) table stored in the example computer of FIG. 2.

More complex cases for the decision at block 330 are contemplated and, with the benefit of this specification, will now occur to those of skill in the art. For example, the QOS table 240-3 may include a full list of applications that are networked as opposed to local. FIG. 6 shows an example of a graphical interface that may be generated on a display output device 212 used to show QOS table 240-3 in terms of categorization of whether a given application is a network application or a local application. A "Default" column is provided that has a virtual "on/off" switch that is set to "on" if an application is deemed to be a network application. A "Customized" column is also provided that has a selectable virtual "on/off" switch that may be adjusted for a given entry by input to a keyboard or mouse input device 204 to designate the application as a "local" application rather than a "network" application. According to the example in FIG. 6, Youtube, Spotify and League of Legends are all shown to be deemed, under the default column, as "network" applications, however under the "Customized" column, Spotify has been manually deemed to be a "local" application. A person of skill in the art will now appreciate that the example QOS table 240-3 is non-exhaustive and that default "Local" applications as well as "Customized" settings for those applications may be included.

Still further complex cases for the decision at block 330 are contemplated when one or more applications 236-4, 236-5 . . . 236-n are executing simultaneously on processor 208. In this event the decision at block 330 may be limited to which application 236 is executing in the foreground. Alternatively, more complex versions of QOS table 240-3 may be implemented with more complex criteria to consider simultaneous execution of local applications and network applications, even if certain applications are executing in the background. At this point it is to be emphasized that the definition of a local application may be relative, in that the local application may still make use of link 112 but will make relatively less use of link 112 than a network application. Incorporating such relative complexities into the QOS table 240-3 and the decision at block 330 are contemplated.

Figure 7:
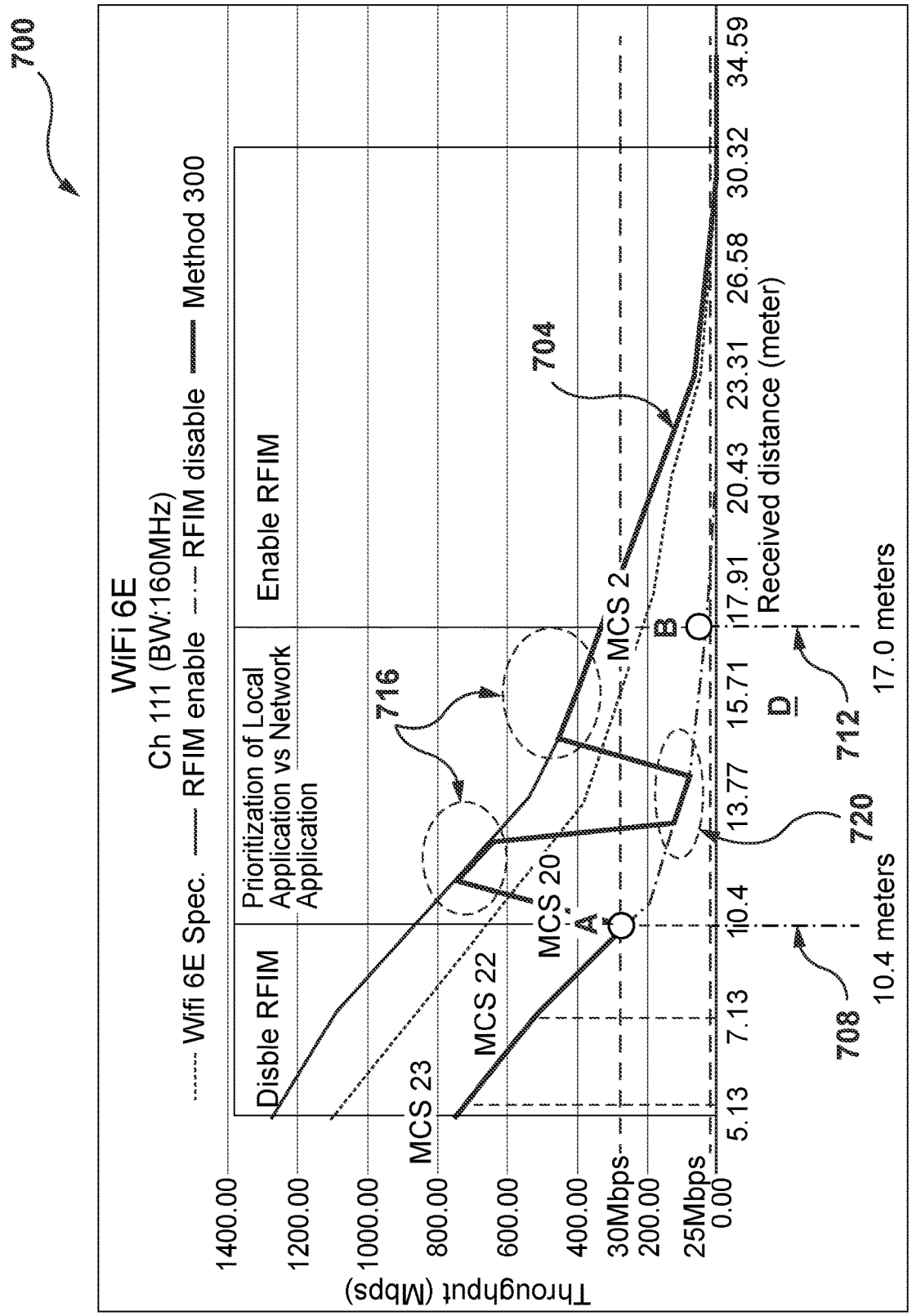
FIG. 7 shows an example performance graph of the example computer in FIG. 2.

Referring now to FIG. 7, an example performance graph is indicated generally at 700. The graph 700 shows an example transmission speed performance curve 704 according to a non-limiting example set of conditions under which computer 104 may be operating, provided for illustrative purposes but not provided to limit the scope of implementations of the present disclosure. In graph 700, the Distance D (previously discussed in relation to FIG. 1 and FIG. 2) between the computer 104 and the wireless base station 108 is shown along the X-axis, with the Distance D increasing from left to right. The data transmission speed along wireless link 112 (labelled "Throughput" and expressed in MBps) is shown in on the Y axis. (Note that the frequency of clock 222 and the corresponding performance of processor 208 is omitted from FIG. 7.)

In FIG. 7, a dashed-line 708 represents the higher threshold HT-MCS value of twenty, above which a "yes" determination will always be made at block 310, and thus the fast frequency for clock 222 will always be selected. Expressed another way, in the example conditions corresponding to the graph 700, the RFIM function will always be disabled for a distance D that is less than 10.4 meters. This will make intuitive sense to person skilled in the art in that locating computer 104 near the base station 108 will generally lead to a high quality wireless link 112, and thus interference between the processor 208 operating at 4800 MHz and the WiFi Channel operating at 2.4 Ghz is mitigated by the close distance between the computer 104 near the base station 108, resulting in part from the reduced power necessary to drive wireless link 112.

Likewise, in FIG. 7, a dashed-line 712 represents the lower threshold HT-MCS value of two, below which a "yes" determination will always be made at block 320, and thus the slow frequency for clock 222 will always be selected. (Note that the processor frequencies are omitted from FIG. 7). Expressed another way, in the example conditions corresponding to the graph 700, the RFIM function will always be enabled for a distance D that is greater than 17.0 meters. This will make intuitive sense to person skilled in the art in that locating computer 104 farther from the base station 108 will generally lead to lower quality wireless links 112, and thus interference between the processor 208 operating at 4800 MHz and the WiFi Channel operating at 2.4 Ghz is increased by the far distance between the computer 104 near the base station 108, resulting in part from the increased power necessary to drive wireless link 112. Accordingly, such interference is mitigated by operating processor 208 at 4400 MHz, albeit with a corresponding drop in performance of execution of applications 236.

The range between dashed-line 708 and dashed-line 712 represents the intermediate range of the threshold values, thus resulting in method 300 reaching block 330 and a determination as to whether to prioritize a network application or a local application. In this intermediate range, the example performance curve 704 has two peaks 716 and one trough 720. The peaks 716 represent "yes" determinations at block 330, wherein a slow frequency for clock 222 is selected resulting in slow processing but higher data transmission speeds. Conversely, the trough 720 represents a "no" determination at block 330, wherein a fast frequency for clock 222 is selected resulting in faster processing but lower data transmission speeds.

In view of the above it will now be apparent that variants are contemplated. For example, the graph in FIG. 7 is purely illustrative, but actual performance of data transmission speeds and processor frequencies would vary depending on specific conditions. The peaks 716 and trough 720 are purely illustrative of examples of certain prioritizations of network applications vs local applications. As another example, certain applications may consume different network resources depending on their mode, such as a video media player that may offer playback at different resolutions. Such applications, while network applications, are on a gradient and may be tolerate a lower quality wireless link, thereby allowing such a network application to be deemed a "local" application for the purposes of this disclosure.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A computing platform comprising:
a memory to store a network application, a local application and a radio interference mitigation (RFIM) application;
a processor connected to the memory to execute the network application and to execute the local application;
the processor to further execute the RFIM application;
the processor to determine whether to prioritize execution of the network application or execution of the local application based on current application execution;
the processor or the memory to operate at a slower frequency or a faster frequency;
a wireless interface connected to the processor and a network;
the wireless interface to transmit data over the network at a lower speed based on a determination to prioritize execution of the local application and to transmit data over the network at a higher speed based on a determination to prioritize execution of the network application; and
the RFIM application to select the faster frequency based on the determination to prioritize execution of the local application and to select the slower frequency based on the determination to prioritize execution of the network application.

2. The computing platform of claim 1 wherein the memory is a Double Data Rate (DDR) Synchronous Dynamic Random-Access Memory (SDRAM) and the processor has a Fully Integrated Voltage Regulator (FIVR) or Digital Linear Voltage Regulator (DLVR).

3. The computing platform of claim 1 wherein the wireless interface is based on the Institute of Electrical and Electronic Engineers ("IEEE") 802.11ax WiFi standard.

4. The computing platform of claim 1 wherein the faster frequency is about 4800 megahertz (MhZ), the slower frequency is about 4400 Mhz, and wherein the wireless interface to transmit data over the network via a channel that is about 2.4 gigahertz (GHz).

5. The computing platform of claim 1 wherein the network application includes a media player.

6. The computing platform of claim 5 wherein the media player to playback media downloaded over the network at different resolutions.

7. The computing platform of claim 1 wherein the memory and the processor operate at additional frequencies.

8. The computing platform of claim 1 wherein the RFIM application selects the faster frequency when a wireless link quality metric greater than a first predefined threshold and selects the slower frequency when the wireless link quality metric is less than a second predefined threshold, irrespective of which application is executing.

9. A non-transitory machine-readable medium comprising instructions that, when executed by a processor, cause the processor to:
determine whether a network application or a local application is currently being executed;
determine to prioritize execution of the network application or execution of the local application based on current application execution;
select a faster frequency to operate the processor or a memory based on a determination to prioritize execution of the local application over execution of the network application, where the faster frequency interferes with a higher transmission speed of a communication channel of a wireless network interface; and
select a slower frequency to operate the processor or the memory based on a determination to prioritize execution of the network application over execution of the local application, where the slow slower frequency does not interfere with the higher transmission speed.

10. The non-transitory machine-readable medium of claim 9 wherein the memory is a Double Data Rate (DDR) Synchronous Dynamic Random-Access Memory (SDRAM) and the processor has a Fully Integrated Voltage Regulator (FIVR) or Digital Linear Voltage Regulator (DLVR).

11. The non-transitory machine-readable medium of claim 9 wherein wireless interface is based on the Institute of Electrical and Electronic Engineers ("IEEE") 802.11ax WiFi standard.

12. The non-transitory machine-readable medium of claim 9 wherein the faster frequency is about 4800 megahertz (MHz), the slower frequency is about 4400 MHZ, and the communication channel is about 2.4 gigahertz (GHz).

13. The non-transitory machine-readable medium of claim 9 wherein the network application includes a media player.

14. The non-transitory machine-readable medium of claim 13 wherein the media player operates at different resolutions.

15. The non-transitory machine-readable medium of claim 9 wherein the memory and the processor operate at additional frequencies.

16. The non-transitory machine-readable medium of claim 9 wherein the processor selects the faster frequency when a wireless link quality metric is greater than a first threshold and selects the slower frequency when the wireless link quality metric is less than a second threshold, irrespective of which application is executing.

17. A method for mitigating radio frequency interference in a computer having a processor, a memory comprising:
receiving a quality measurement of a wireless link over a wireless interface communication channel;
determining that the quality measurement is between a first threshold and a second threshold;
determining whether to prioritize execution of a local application or execution of a network application based on current application execution; and
performing one of:
operating the processor at a faster frequency based on a determination to prioritize execution of the local application over execution of the network application, where the faster frequency interferes with a higher transmission speed of the wireless interface communication channel; and operating the processor at a slower frequency based on a determination to prioritize execution of the network application over execution of the local application, where the slower frequency does not interfere with the higher transmission speed.

18. The method of claim 17 wherein the quality measurement is based on a high throughput modulation and coding scheme (HT-MCS) index.

19. The method of claim 18 wherein the first threshold is about two and the second threshold is about twenty-three.

20. The method of claim 17 further comprising wherein when the quality measurement is below the first threshold, operating the processor at the slower frequency and when the quality measurement is above the second threshold, operating the processor at the faster frequency.

* * * * *